United States Patent
P et al.

(10) Patent No.: US 7,646,716 B2
(45) Date of Patent: Jan. 12, 2010

(54) PACKET PROCESSING IN A WIRELESS NETWORK

(75) Inventors: Balakrishna P, Karnataka (IN);
Sreenivasa Murthy T, Karnataka (IN);
Girija Prasanna Swain, Karnataka (IN);
Pratap Simha, Karnataka (IN);
Rajneesh Rathi, Karnataka (IN);
Sreenivasulu M, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 10/326,468

(22) Filed: Dec. 20, 2002
(Under 37 CFR 1.47)

(65) Prior Publication Data
US 2004/0122981 A1    Jun. 24, 2004

(51) Int. Cl.
*G01R 31/08*    (2006.01)
(52) U.S. Cl. .................. 370/235; 370/392; 370/474
(58) Field of Classification Search .................. None
See application file for complete search history.

(56) References Cited

U.S. PATENT DOCUMENTS

| | | | | |
|---|---|---|---|---|
| 6,427,173 B1 * | 7/2002 | Boucher et al. | ............ | 709/238 |
| 6,990,089 B2 * | 1/2006 | Benedyk et al. | ............ | 370/338 |
| 7,237,031 B2 * | 6/2007 | Cheng | ............ | 709/230 |
| 2001/0037397 A1 | 11/2001 | Boucher et al. | | |
| 2002/0105969 A1 | 8/2002 | Benedyk et al. | | |
| 2003/0221015 A1 * | 11/2003 | Basso et al. | ............ | 709/234 |
| 2004/0003126 A1 * | 1/2004 | Boucher et al. | ............ | 709/250 |

FOREIGN PATENT DOCUMENTS

| | | |
|---|---|---|
| JP | 61-004344 | 6/1984 |
| JP | 2002-524005 | 6/2002 |
| WO | 0117179 A1 | 3/2001 |

OTHER PUBLICATIONS

"3rd Generation Partnership Project; Technical Specification Group Radio Access Network; UTRAN Iub/Iur Interface User Plane Protocol for DCH Data Streams (Release 1999)", 3G TS 25.427 V3.2.0, Mar. 2000, pp. 1-30, XP:002288168.

"MXP3021 Multi-Service Packet Transport Platform," Product Overview, Motorola, Jan. 2002, pp. 1-6, XP: 002288165.

(Continued)

*Primary Examiner*—Jayanti K Patel
*Assistant Examiner*—Jung Park
(74) *Attorney, Agent, or Firm*—Kacvinsky LLC (57) ABSTRACT

Techniques to process packets for a wireless network are described. Such techniques may include determining whether a packet received by a radio network controller (RNC) includes control information or payload information. If the packet includes control information, it is sent to a slow path processing module (SPPM). However, if the packet includes payload information, it is sent to a fast path processing module (FPPM).

75 Claims, 4 Drawing Sheets

400

OTHER PUBLICATIONS

"Digital Cellular Telecommunications System (Phase 2+); Universal Mobile Telecommunications System (UMTS); Architecture Requirements for Release 99 (3GPP TS 23.121 Version 3.6.0 Release 1999)", ETSI TS 123 121 V3.6.0, Jun. 2002, pp. 1-57, XP: 002288167.

"Network Processors", Intel Technology Journal, vol. 6, No. 3, Aug. 15, 2002, pp. 1-93, XP: 002288166.

Daniel Hedberg, "Network Processor Based Exchange Terminal—Implementation and Evaluation", Master Thesis Report, Dec. 5, 2002, pp. 1-18, XP: 002288164, Royal Institute of Technology.

Harsh, V., et al., Network Processor Building Blocks for ALL-IP Wireless Networks, Intel Technology Journal, Aug. 15, 2002, pp. 61-69, vol. 06, Issue 03.

* cited by examiner

PACKET PROCESSING IN A WIRELESS NETWORK

BACKGROUND

Next generation wireless networks are moving to packet-based technology to facilitate communication of multimedia information. Although more robust in terms of the type of information carried by the network, the packet processing requirements may in some cases slow down system performance. This may be undesirable, particularly with respect to those applications having a high Quality of Service (QoS) requirement, such as voice communications. Consequently, there may be a need for improved techniques to process packets in a wireless network to communicate multimedia information.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to process packets in a network. In one embodiment of the invention, a packet may be received at a radio network controller (RNC) for a Universal Mobile Telecommunication System (UMTS). A determination may be made as to whether the packet includes control information or payload information. An example of payload information may be voice information. The packet may be sent to a Slow Path Processing Module (SPPM) if the packet includes control information, and to a Fast Path Processing Module (FPPM) if the packet includes payload information. The FPPM may include, for example, a network processor optimized to process the payload information. This may be particularly important for voice information, which has fairly stringent QoS requirements.

In one embodiment of the invention, the term "information" as used herein may refer to any data capable of being carried by a network. Examples of information in this context may include data from a voice conversation, videoconference, streaming video, electronic mail ("email") message, voice mail message, alphanumeric symbols, graphics, image, video, text and so forth. The term "control information" as used herein may refer to any information representing commands or instructions for a given protocol, such as control plane traffic. The term "payload information" as used herein may refer to any information representing content or data to be delivered by a given protocol, such as data plane or forwarding plane traffic.

More particularly, individual network elements in a UMTS network may impose significant processing requirements on packet traffic. The data path between a User Equipment (UE) such as a mobile telephone and a destination device may include, for example, a Node B, a RNC, a Servicing GPRS Support Node (SGSN) and a Mobile Services Switching Center (MSC). Each of these network elements may add processing and forwarding latency that exceeds the design constraints (e.g., QoS requirements) for a particular wireless network. Further, a UMTS network utilizes Wideband Code Division Multiple Access (W-CDMA) as the layer 1 (L1) air interface, which in turn may demand a greater amount of signaling exchange between the UE and UMTS network as compared to traditional wireless networks, such as the Global System For Mobile Communications (GSM). Consequently, techniques may be needed to reduce processing delays at each network element to reduce overall system delay to tolerable levels.

The embodiments of the invention attempt to provide a system architecture approach for the RNC to achieve Layer 1 or "wire line" speeds for processing packet data. One embodiment of the invention separates packets based on the type of information they are carrying. For example, one division may be made based on whether the packet is carrying control information or payload information. The control information may be processed using "slow path" switching, while payload information may be processed using "fast path" switching.

In one embodiment of the invention, the fast path switching may include a network processor to achieve Layer 1 speeds. The network processor may be programmed to implement only limited functionalities for data packet processing. This may reduce the processing time for the RNC, and thus for the entire UMTS network. It may also require less processing requirements on the network processor, as compared to implementing all aspects of data plane protocols on the network processor, and thus the power to performance requirements may be improved.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

The embodiments of the invention may incorporate functionality that may be implemented as software executed by a processor, hardware circuits or structures, or a combination of both. The processor may be a general-purpose or dedicated processor, such as a processor from the family of processors made by Intel® Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e, floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

Figure 1:
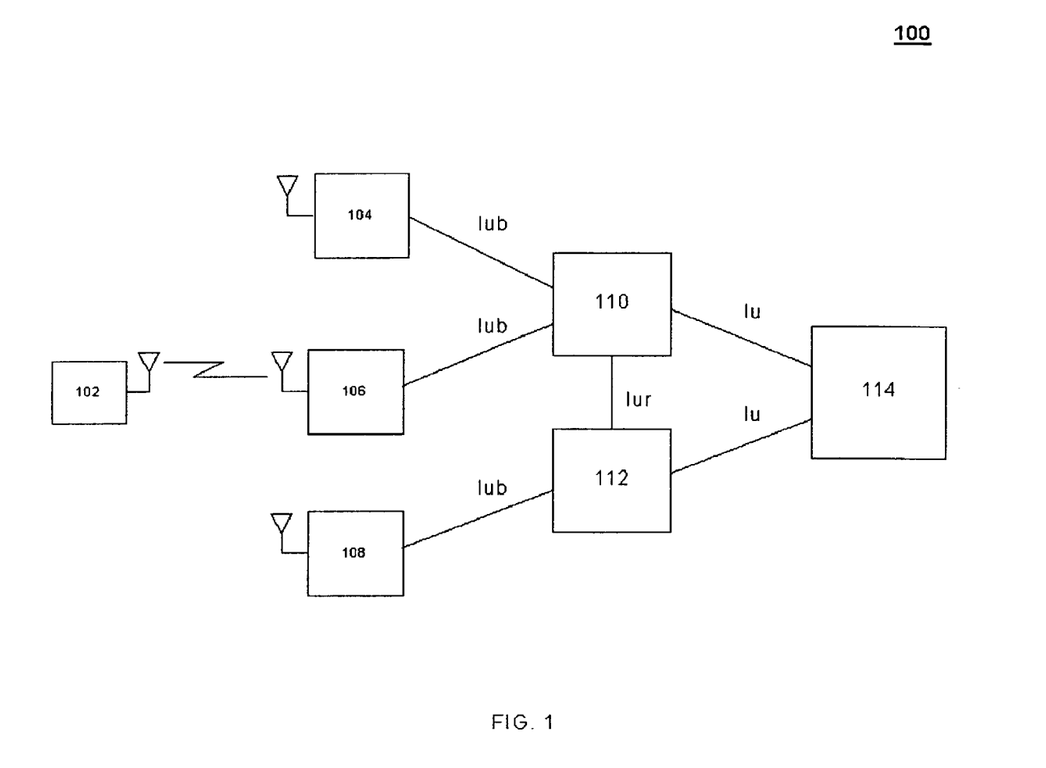
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a UMTS network 100 that may represent a UMTS network in accordance with, for example, the Third-Generation Partnership Project (3GPP) 3G TS line of specifications. As shown in FIG. 1, UMTS network 100 may comprise a UE 102 in wireless communication with one or more Node B systems 104, 106 and/or 108. Node B systems 104 and 106 may be connected to a RNC 110, while Node B system 108 may be connected to a RNC 112. Both RNC 110 and RNC 112 may be connected to each other, as well as to a MSC 114. It can be appreciated that system 100 is provided by way of example, and may comprise more or less elements in various topologies and still fall within the scope of the invention.

The various UMTS network elements may communicate information in accordance with one or more communication protocols. For example, UE 102 and Node B systems 104, 106 and 108 may communicate in accordance with one or more "Uu interface" protocols, such as the 3GPP specification titled "Radio Resource Control (RRC) Protocol Specification," 3G TS 25-331, release 1999 ("Uu Specification"). In another example, Node B systems 104, 106 and 108 may communicate with RNC 110 and/or RNC 112 in accordance with one or more "Iub interface" protocols, such as the 3GPP specification titled "UTRAN Iub Interface: General Aspects and Principles," 3G TS 25-430, release 1999 ("Iub Specification"). In yet another example, RNC 110 and RNC 112 may communicate information with each other in accordance with one or more "Iur interface" protocols, such as the 3GPP specification titled "UTRAN Iur Interface: General Aspects and Principles," 3G TS 25-420, release 1999 ("Iur Specification"). In yet another example, RNC 110 and RNC 112 may communicate information with MSC 114 in accordance with one or more "Iu interface" protocols, such as the 3GPP specification titled "UTRAN Iu Interface: General Aspects and Principles," 3G TS 25-410, release 1999 ("Iu Specification"). The embodiments, however, are not limited in this context.

Figure 2:
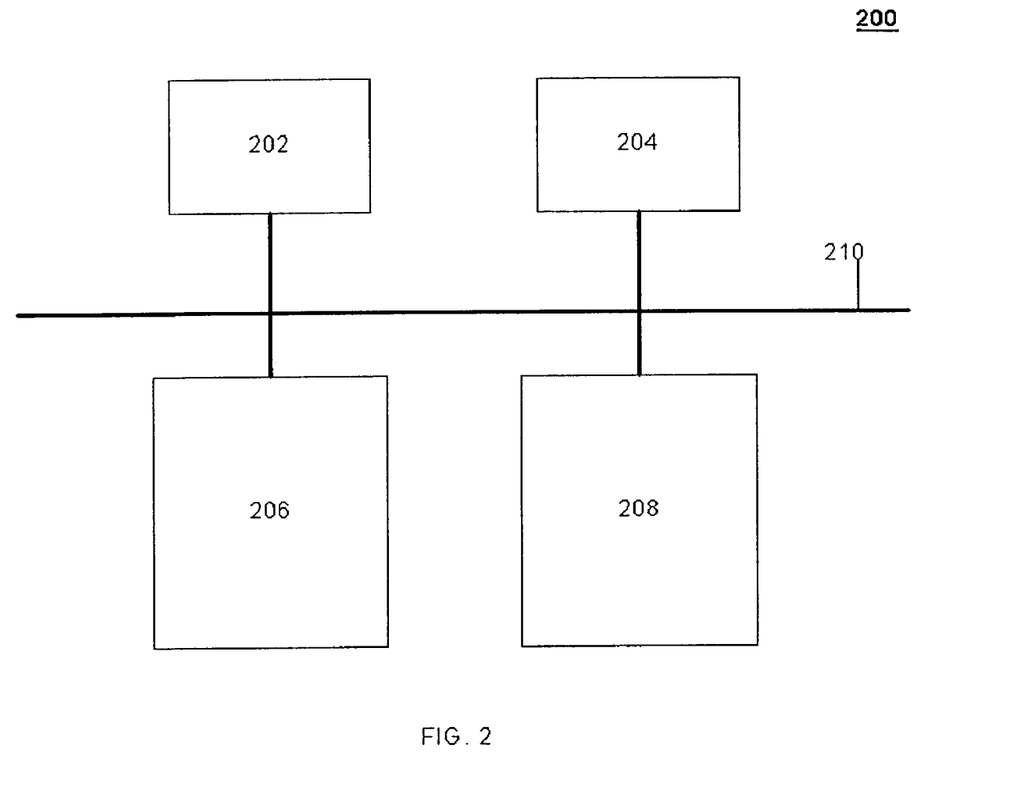
FIG. 2 is a block diagram of a Radio Network Controller (RNC) in accordance with one embodiment of the invention.

FIG. 2 illustrates a block diagram of a RNC in accordance with one embodiment of the invention. FIG. 2 illustrates a system 200. System 200 may represent part of a RNC, such as RNC 110 and RNC 112, for example. In one embodiment of the invention, RNC 200 may comprise a host card 202, an Ethernet switching module 204, an Iub line card 206 and an Iu line card 208, all connected via a high-speed Ethernet back plane 210. Tub line card 206 may process the Tub interface traffic in accordance with the Tub Specification. Iu line card 208 may process Iu interface traffic in accordance with the In Specification. Tub line card 206 and Iu line card 208 may each host two categories of processors. The first category may comprise one or more network processors directed to executing the data plane protocols. The second category may comprise one or more control plane processors directed to executing the signaling protocols. Host card 202 may execute the RNC application and additional signaling protocols. Ethernet switching module 204 may switch packets of information between the host and line cards via high-speed Ethernet back plane 210.

Figure 3:
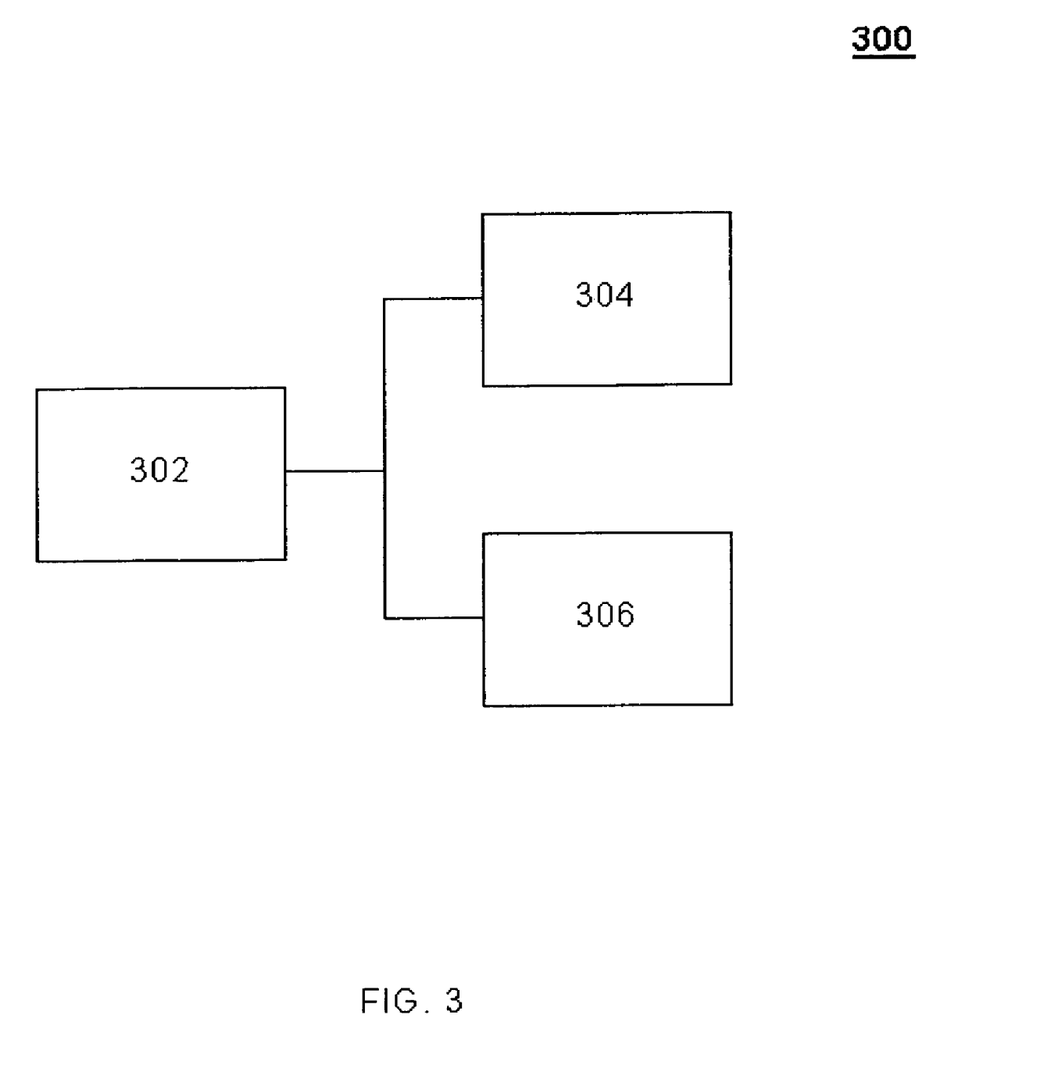
FIG. 3 is a block diagram of a line card for an RNC in accordance with one embodiment of the invention.

FIG. 3 is a block diagram of a line card for a RNC in accordance with one embodiment of the invention. FIG. 3 illustrates a line card 300 that may represent part of, for example, Tub line card 206 or Iu line card 208. In one embodiment of the invention, for example, line card 300 may comprise a SPPM 304 and a FPPM 306. SPPM 304 may comprise a general-purpose processor and associated application software. SPPM 304 may be used to process control information for line card 300. FPPM 306 may comprise a network processor and associated software. FPPM 306 may be used to process payload information for line card 300.

In one embodiment of the invention, the network processor may be, for example, an Intel IXP 2800® based network processor containing multiple processing elements, such as multiple microengines and a processor core. The processing core may be, for example, an Intel StrongARM® Core (ARM is a trademark of ARM Limited, United Kingdom). The processor core may also include a central controller that assists in loading code for other resources of the network processor, for example, and performs other general-purpose computer type functions such as handling protocols, exceptions and extra support for packet processing. The microengines may include memory that may have the capability to store instructions, for example. For example, in one embodiment there may be sixteen microengines, with each microengine having the capability to process eight program threads. It can be appreciated, however, that the claimed subject matter is not limited in this respect.

In one embodiment of the invention, a switching module 302 may determine whether a packet carries control information or payload information, and forward the packet to the appropriate processing module. In another embodiment of the invention, switching module 302 may be omitted and the various inputs for SPPM 304 and FPPM 306 may be "hardwired" to the appropriate processing module based on the signaling data path. For example, some packet data traffic may have dedicated transport channels. Therefore, any information received over a given transport channel, or having an associated logical channel identifier, may be assumed to be payload information and routed directly to FPPM 306. Another example may be that some packet data traffic may be allocated on shared transport channels and hence may be routed directly to SPPM 304. These "hard-wire" decisions are typically policy decisions by the Telecommunication Equipment Manufacturer (TEM).

The architecture of line card 300 may be focused on processing payload information in the fast path using a network processor. The network processor may be programmed to implement those portions of the communication protocols used to process payload information, such as carried by packet data traffic in the data or forwarding plane. More particularly, the fast path processing is applicable for those packet data services that are allocated with the dedicated transport channels. As a result, line card 300 may increase system throughput. This may free up other processing entities in the system to address other tasks, such as radio link establishment, power control and a host of other activities.

Packet data traffic may be particularly suitable for processing by a network processor for a number of reasons. For example, packet data traffic is typically "bursty" in nature. Further, it has several identifiable modes such as the Radio Link Control (RLC) Transparent Mode (TM), Unacknowledged Mode (UM) and Acknowledged Mode (AM). In addition, the Media Access Control (MAC) may use dedicated transport channels for certain packet data traffic, and therefore may not be required to multiplex traffic from different user equipment onto the same transport channels. Finally, there may be reduced functionality required for processing packet switched user data, such as the user data on the Iu Packet Switched (Iu-PS) User Part (UP) and GPRS Tunneling Protocol (GTP) user (GTP-u) protocol, as defined by the 3GPP specification 3G TS 29.060, release 1999 ("GTP Specification").

The operations of systems 100, 200 and 300 may be further described with reference to FIG. 4 and accompanying examples. Although FIG. 4 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 4:
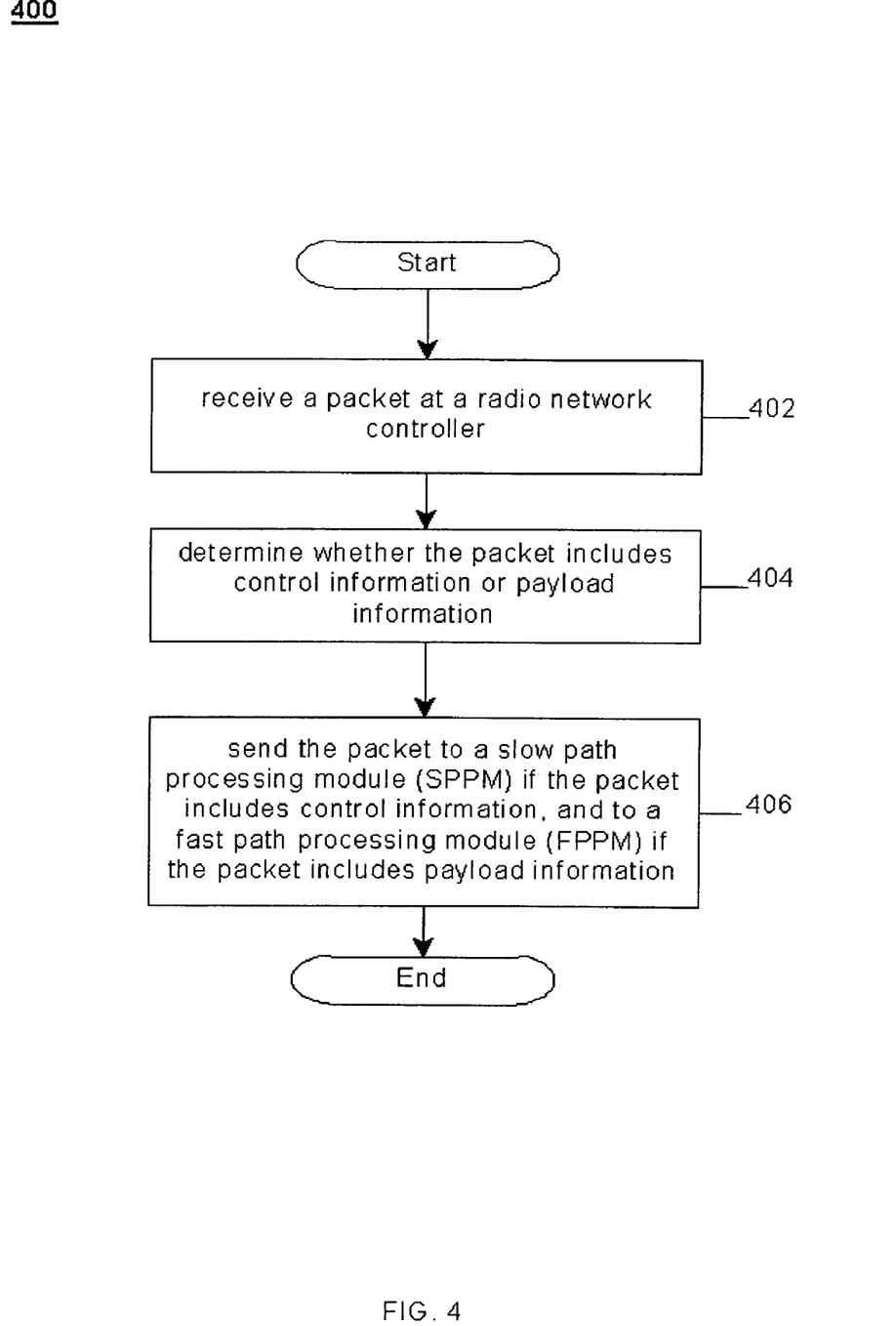
FIG. 4 is a first block flow diagram of programming logic performed by a line card for an RNC in accordance with one embodiment of the invention.

FIG. 4 is a block flow diagram of the programming logic performed by a line card for a RNC in accordance with one embodiment of the invention. FIG. 4 illustrates a programming logic 400. Programming logic 400 may illustrate operations to process packets in a network, such as a UMTS network. A packet may be received at a RNC at block 402. A determination as to whether the packet includes control information or payload information may be made at block 404. If the packet includes control information, the packet may be sent to a SPPM to process the packet at block 406. If the packet includes payload information, the packet may be sent to a FPPM to process the packet at block 406. In one embodiment of the invention, the FPPM may include a network processor to accelerate processing of the payload information.

In one embodiment of the invention, each packet may have an associated "packet type" and "direction." The packet type may be defined by a given protocol used to format or communicate a packet. For example, a packet may carry payload information in accordance with the Internet Protocol (IP) as defined by the Internet Engineering Task Force (IETF) standard 5, Request For Comment (RFC) 791, dated September 1981 ("IP Specification"). The packet type for such a packet may be, for example, referred to as an "IP packet." The direction associated with each packet may refer to the processing path for a packet. For example, a packet communicated from a UE to a RNC may be considered to be traveling in an "uplink" direction. A packet communicated from a RNC to a UE may be considered to be traveling in a "downlink" direction. The packet type and direction for each packet may be assigned, or alternatively, may be determined from a set of criteria, such as the packet format, port assignments, predetermined flags, protocol fields, transport channel, logical channel, and so forth.

In one embodiment of the invention, the FPPM may receive the packet. The FPPM may then process the packet based on the packet type and direction in accordance with at least one protocol from a "protocol stack." The term "protocol stack" may refer to a set of processing layers, with each processing layer processing information in accordance with one or more protocols. For example, Layer 1 typically includes physical layer protocols, such as E1, T1, E3, T3, STM and Synchronous Optical Network (SONET) protocols. Layer 2 may comprise, for example, the Point-To-Point Protocol (PPP) protocol as defined by the Internet Engineering Task Force (IETF) standard 51, Request For Comment (RFC) 1661, dated July 1994 ("PPP Specification"). Layer 3 (L3) may include, for example, the IP protocol in accordance with the IP Specification. It may be appreciated that these are merely examples.

In a UTMS network, such as system 100, there may be many layers of communication protocols, and the claimed subject matter is not limited in this context.

In one embodiment of the invention, the FPPM may include a network processor programmed to implement those functionalities that are desired to process payload information in accordance with each protocol in the protocol stack. The complete protocol stack for data and signaling path may be present on a control plane processor to handle exception data from the NP and streaming, interactive and background class of traffic. The control plane processor may be, for example, the general-purpose processor of host card 202.

In one embodiment of the invention, FPPM 306 of Iub line card 206 may be programmed to implement those functionalities that are desired to process payload information in accordance with the various protocols typically processed by Iub line card 206. For example, FPPM 306 may process packets in accordance with the PPP protocol as defined PPP Specification. The PPP protocol is normally processed in Layer 2 of the transport network. In the uplink direction, the received PPP packets may be transferred to the IP layer. In the downlink direction, IP packets may be received, and the appropriate PPP header and payload may be prepared and sent to Layer 1 of the protocol stack.

In one embodiment of the invention, FPPM 306 of Iub line card 206 may process packets in accordance with the IP protocol as defined by the IP Specification. The IP protocol is normally processed in Layer 3 (L3) of the transport network. In the uplink direction, IP packets may be received and transferred to a User Datagram Protocol (UDP) layer or a Stream Control Transmission Protocol (SCTP) layer based on the service user, e.g., a UDP or SCTP port. In the downlink direction, a UDP packet and SCTP streams may be received. In this case, the appropriate IP header and payload will be prepared and sent to the PPP layer.

In one embodiment of the invention, FPPM 306 of Iub line card 206 may process packets in accordance with UDP as defined by the IETF standard 6, RFC 768, dated August 1980 ("UDP Specification"). The UDP protocol is normally processed in Layer 4 of the transport network. In the uplink direction, UDP packets may be received and transferred to the Frame Protocol (FP) layer based on the service user, e.g., FP bearer for a given transport channel(s). In the downlink direction, a FP packet with an FP payload may be received. The appropriate UDP header and payload may be prepared and sent to the IP layer.

In one embodiment of the invention, FPPM 306 of Iub line card 206 may process packets in accordance with a FP as defined by the 3GPP 3G TS suite of protocols. FPPM 306 may prepare a frame payload in the form of transport blocks from the MAC in the downlink direction. FPPM 306 may also deliver transport blocks to the MAC in the uplink direction.

In another example, FPPM 306 of Iub line card 206 may process packets in accordance with diversity selection for UMTS. In the uplink direction, the FPPM may select the best frame based on a quality estimate flag in each FP frame. In the downlink direction, FPPM 306 may duplicate a frame on each path of the macro diversity as appropriate.

In one embodiment of the invention, FPPM 306 of Iub line card 206 may process packets in accordance with the Media Access Control Dedicated (MAC-D) layer requirements for UMTS. For example, in the uplink direction FPPM 306 may check for correctness of the Transport Format (TFI) in the transport block. FPPM 306 may also decipher and deliver the transport blocks to the RLC layer. In the downlink direction, FPPM 306 may cipher and deliver transport blocks to the FP layer. The ciphering may be suitable for packets in the RLC- TM mode, for example. FPPM 306 may also choose the best Transport Format Combination (TFCI) at the MAC-D layer, based on information from the application layer, such as the mapping of Radio Access Bearer (RAB) sub-flows (RFCI) and TFCI. Further, FPPM 306 may perform the appropriate measurement reporting as needed.

In one embodiment of the invention, FPPM 306 of line card 206 may process packets in accordance with the RLC protocol layer requirements for UMTS. In the downlink direction, FPPM 306 may receive data packets from In line card 208 via a Data Relay (DR) in the form of RLC Service Data Units (SDUs). The DR may transfer the RLC payload between Iub line card 206 and In line card 208. In the uplink direction, FPPM 306 may send RLC SDUs to Iu line card 208 via the DR.

In one embodiment of the invention, FPPM 306 of Iub line card 208 may be programmed to implement those functionalities that are desired to process payload information in accordance with the various protocols typically processed by in line card 208. For example, FPPM 306 may process packets in accordance with the PPP protocol. The PPP protocol is normally processed in L2 of the transport network. In the uplink direction, the received PPP packets may be transferred to the IP layer. In the downlink direction, IP packets may be received, and the appropriate PPP header and payload may be prepared and sent to Layer 1 of the protocol stack.

In one embodiment of the invention, FPPM 306 of Iu line card 208 may process packets in accordance with the IP protocol. The IP protocol is normally processed in L3 of the transport network. In the uplink direction, the received IP packets may be transferred to the UDP layer or SCTP layer based on the service user, e.g., a UDP or SCTP port. In the downlink direction, a UDP packet and SCTP streams may be received. In this case, the appropriate IP header and payload will be prepared and sent to the PPP layer.

In one embodiment of the invention, FPPM 306 of Iu line card 208 may process packets in accordance with the UDP protocol. The UDP protocol is normally processed in L4 of the transport network. In the uplink direction, a Real Time Protocol (RTP) packet with a RTP payload may be received. The RTP packet may be created in accordance with the RTP protocol as defined by the IETF RFC 1889, dated January 1996 ("RTP Specification"), for example. FPPM 306 may prepare the appropriate UDP header and payload and send the packet to the IP layer. In the downlink direction, the received UDP packets may be transferred to the RTP layer based on the service user, e.g., RTP session for a given RAB.

In one embodiment of the invention, FPPM 306 of Iu line card 208 may process packets in accordance with the GTP protocol as defined by the GTP Specification. In the uplink direction, a Packet Data Convergence Protocol (PDCP) packet may be received. FPPM 306 may prepare a GTP header and GTP payload using a PDCP payload from the PDCP packet. The GTP packet may then be transferred to the core network via a UDP port. In the downlink, a GTP packet may be received. A GTP payload may be processed, PDCP SDUs prepared and transferred to the PDCP layer.

In one embodiment of the invention, FPPM 306 of Iu line card 208 may process packets in accordance with the PDCP protocol as defined by the 3GPP specification 3G TS 25.323, release 1999 ("PDCP Specification"). In the uplink and downlink directions, FPPM 306 may perform header compression in the uplink direction, and header decompression in the downlink direction, for any received packets.

In one embodiment of the invention, FPPM 306 of Iu line card 208 may process packets in accordance with the Iu-PS UP as defined by the Iu Specification. In the uplink direction, FPPM 306 may receive a PDCP packet and prepare frame payloads. In the downlink direction, FPPM 306 may deliver data to the PDCP layer.

As shown above, packet data traffic on the Iub line card is processed in its network processor and relayed on the high-speed backbone to the Iu line card to be processed and sent on the Iu interface. As the processing technologies in the network processor are at wire line (input/output) speeds, packet data traffic is consequently switched from the Iub/Iu interface at wire line speeds, thereby reducing the overall delay experienced by a packet in the RNC.

In one embodiment of the invention, Iub line card 206 and In line card 208 of RNC 200 may be optimized to process payload information in the form of voice information. Voice information in particular may have fairly stringent QoS requirements for a system, such as UMTS network 100. As such, FPPM 306 for Iub line card 206 and Iu line card 208 may be programmed to implement certain portions of protocols directed to voice communications. In this embodiment, Iub line card 206 and Iu line card 208 may operate as discussed previously with respect to general payload information, with the modifications for processing voice packets discussed below. It is worthy to note that voice information should be used in RLC-TM mode service and dedicated transport channel(s). In addition, the associated logical channel (DCCH) to carry associated control plane signaling for the voice connection should be mapped to a transport channel other than the one used for the voice information. In this manner, voice information may be hard-wired for processing by FPPM 306 according to the appropriate transport channel.

In one embodiment of the invention, FPPM 306 of Iub line card 206 may be modified to process voice packets in accordance with the RLC-TM protocol layer requirements for UMTS. In the downlink direction, FPPM 306 may receive data packets from Iu line card 208 via a data relay in the form of RLC SDUs. The data relay may transfer the RLC payload between Iub line card 206 and Iu line card 208. In the uplink direction, FPPM 306 may send RLC SDUs to Iu line card 208 via the data relay. In this embodiment, no buffering may be needed for the voice path. The voice payload may be segmented and reassembled as desired.

In one embodiment of the invention, FPPM 306 of Iu line card 208 may be modified to process voice packets in accordance with the RTP protocol as defined by the RTP Specification. In the uplink direction, a RLC packet may be received. FPPM 306 may prepare a RTP header and RTP payload using a RLC payload from the RLC packet. The RTP packet may then be transferred to the core network via a UDP port. In the downlink, a RTP packet may be received. A RTP payload may be processed, RTP SDUs prepared and transferred to the RLC-TM layer via the data relay.

In one embodiment of the invention, FPPM 306 of Iu line card 208 may be modified to process voice packets in accordance with the In Circuit Switched (CS) FP as defined by the UMTS 3G TS line of specifications. In the uplink direction, FPPM 306 may receive a RTP packet and prepare frame payloads. In the downlink direction, FPPM 306 may deliver data to the RTP layer.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to process packets in a network, comprising:
   receiving a packet at one of a plurality of line cards of a radio network controller (RNC) comprising an Ethernet backplane to communicate information between said plurality of line cards, at least one of said line cards comprising a slow path processing module (SPPM) and a fast path processing module (FPPM) and at least one of said line cards to execute an application for the RNC;
   determining whether said packet includes control information or payload information, said payload information comprising voice information;
   sending said packet to said SPPM comprising a general processor of said line card if said packet includes control information, and to said FPPM comprising a network processor of said line card if said packet includes payload information;
   receiving said packet at said FPPM of said line card;
   determining a packet type and direction for said packet; and
   processing said packet based on said packet type and direction in accordance with at least one protocol from a protocol stack.

2. The method of claim 1, wherein said protocol is directed to processing payload information for said packet.

3. The method of claim 2, wherein said receiving comprises receiving said packet at an Iub line card of said RNC.

4. The method of claim 3, wherein said packet type comprises a PPP packet and an uplink direction, and said processing comprises sending said packet to a higher layer on said protocol stack.

5. The method of claim 3, wherein said packet type comprises an IP packet and a downlink direction, and said processing comprises:
   creating a PPP packet from said packet, said PPP packet comprising PPP header information and PPP payload information; and
   sending said PPP packet to a lower layer on said protocol stack.

6. The method of claim 3, wherein said packet type comprises an IP packet and an uplink direction, and said processing comprises:
   determining a service user for said packet;
   sending said packet to a UDP port if said service user is UDP; and
   sending said packet to a SCTP port if said service user is SCTP.

7. The method of claim 3, wherein said packet type comprises one of a UDP packet and SCTP packet in a downlink direction, and said processing comprises:
   creating an IP packet from said packet, said IP packet comprising IP header information and IP payload information; and
   sending said IP packet to a lower layer of said protocol stack.

8. The method of claim 3, wherein said packet type comprises a UDP packet and an uplink direction, and said processing comprises sending said packet to an FP port.

9. The method of claim 3, wherein said packet type comprises a FP packet and a downlink direction, and said processing comprises:
   creating a UDP packet from said packet, said UDP packet comprising UDP header information and UDP payload information; and
   sending said UDP packet to a lower layer of said protocol stack.

10. The method of claim 3, wherein said packet type comprises one of a Iub FP packet and Iur FP packet in an uplink direction, and said processing comprises sending at least one transport block from said packet to an upper layer of said protocol stack.

11. The method of claim 3, wherein said packet type comprises one of an Iub FP packet and Iur FP packet in a downlink direction, and said processing comprises:
   creating a FP packet from said packet, said FP packet comprising FP header information and FP payload information; and
   sending said FP packet to a lower layer of said protocol stack.

12. The method of claim 11, wherein said FP payload information comprises at least one transport block.

13. The method of claim 3, wherein said packet comprises one or more FP packets from all diversity paths in an uplink direction, and said processing comprises:
   retrieving a quality estimate flag from said packet;
   comparing said quality estimate flag with a predetermined value; and
   selecting said packet for diversity selection in accordance with said comparison.

14. The method of claim 3, wherein said packet type comprises an FP packet in a downlink direction, and said processing comprises:
   duplicating said packet; and
   sending said duplicate packet on at least one macro diversity path for said RNC.

15. The method of claim 3, wherein said packet type comprises a MAC-D packet in an uplink direction, and said processing comprises:
   determining validity of a TFI of at least one transport block of said packet;
   deciphering said at least one transport block; and
   sending said at least one transport block to an upper layer of said protocol stack.

16. The method of claim 3, wherein said packet type comprises a MAC-D packet in a downlink direction, and said processing comprises:
   ciphering at least one transport block of said packet;
   determining a transport format combination for said at least one transport block;
   sending said at least one transport block to a lower layer of said protocol stack using said transport format combination; and
   reporting measurement information.

17. The method of claim 3, wherein said packet type comprises an RLC-TM packet in an uplink direction, and said processing comprises sending said packet to an upper layer of said protocol stack.

18. The method of claim 3, wherein said packet type comprises an RLC-TM packet in a downlink direction, and said processing comprises:
   creating an RLC SDU packet from said packet, said RLC SDU packet comprising RLC SDU header information and RLC SDU payload information; and
   sending said RLC SDU packet to a lower layer of said protocol stack.

19. The method of claim 3, wherein said packet comprises a DR packet in an uplink direction, and said processing comprises sending said DR packet to a line card for said RNC.

20. The method of claim 3, wherein said packet comprises a DR packet in a downlink direction, and said processing comprises sending said DR packet to a RLC layer of said protocol stack.

21. The method of claim 2, wherein said receiving comprises receiving said packet a Iu line card of said RNC.

22. The method of claim 21, wherein said packet type comprises a PPP packet in an uplink direction, and said processing comprises sending said PPP packet to a lower layer of said protocol stack.

23. The method of claim 21, wherein said packet type comprises an IP packet in a downlink direction, and said processing comprises:
creating a PPP packet from said packet, said PPP packet comprising PPP header information and PPP payload information; and
sending said PPP packet to an upper layer on said protocol stack.

24. The method of claim 21, wherein said packet type comprises an IP packet and an uplink direction, and said processing comprises:
determining a service user for said packet;
sending said packet to a UDP port if said service user is UDP; and
sending said packet to a SCTP port if said service user is SCTP.

25. The method of claim 21, wherein said packet type comprises one of a UDP packet and SCTP packet in a downlink direction, and said processing comprises:
creating an IP packet from said packet, said IP packet comprising IP header information and IP payload information; and
sending said IP packet to an upper layer of said protocol stack.

26. The method of claim 21, wherein said packet type comprises a UDP packet in an uplink direction, and said processing comprises:
determining a service user for said packet; and
sending said packet to an RTP port if said service user is RTP.

27. The method of claim 21, wherein said packet type comprises a RTP packet in a downlink direction, and said processing comprises:
creating a UDP packet from said packet, said UDP packet comprising UDP header information and UDP payload information; and
sending said UDP packet to an upper layer of said protocol stack.

28. The method of claim 21, wherein said packet type comprises a FP packet in an uplink direction, and said processing comprises:
creating a GTP packet from said packet, said GTP packet comprising GTP header information and GTP payload information; and
sending said GTP packet to a UDP port.

29. The method of claim 21, wherein said packet type comprises a GTP packet in a downlink direction, and said processing comprises:
creating a FP packet from said packet; and
sending said FP packet to a FP layer.

30. The method of claim 21, wherein said packet type comprises a PDCP packet in an uplink direction, and said processing comprises compressing a PDCP header for said PDCP packet.

31. The method of claim 21, wherein said packet type comprises a PDCP packet in a downlink direction, and said processing comprises decompressing a PDCP header for said PDCP packet.

32. The method of claim 21, wherein said packet type comprises a PDCP packet in an uplink direction, and said processing comprises:
creating a FP packet from said packet; and
sending said FP packet a FP layer.

33. The method of claim 21, wherein said packet type comprises a FP packet in a downlink, direction, and said processing comprises:
creating a PDCP packet from said packet; and
sending said packet to a PDCP port.

34. The method of claim 21, wherein said packet type comprises a FP packet in an uplink direction, and said processing comprises:
creating a RTP packet from said packet, said RTP packet comprising RTP header information and RTP payload information; and
sending said RTP packet to a UDP port.

35. The method of claim 21, wherein said packet type comprises a RTP packet in a downlink direction, and said processing comprises:
creating a FP packet from said packet; and
sending said FP packet to a FP layer.

36. The method of claim 21, wherein said packet type comprises a RTP packet in an uplink direction, and said processing comprises:
creating a FP packet from said packet; and
sending said FP packet a FP port.

37. The method of claim 21, wherein said packet type comprises a FP packet in a downlink direction, and said processing comprises:
creating a RTP packet from said packet; and
sending said packet to a RTP port.

38. An article comprising:
a computer-readable storage medium;
said computer-readable storage medium including stored instructions that, when executed by a processor, result in processing packets in a network by receiving at one of a plurality of line cards of a packet at a radio network controller (RNC) comprising an Ethernet backplane to communicate information between said plurality of line cards, at least one of said line cards comprising a slow path processing module (SPPM) and a fast path processing module (FPPM) and at least one of said line cards to execute an application for the RNC, determining whether said packet includes control information or payload information, said payload information comprising voice information, sending said packet to said SPPM comprising a general processor of said line card if said packet includes control information, and to said FPPM comprising a network processor of said line card if said packet includes payload information, receiving said packet at said FPPM of said line card, determining a packet type and direction for said packet, and processing said packet based on said packet type and direction in accordance with at least one protocol from a protocol stack.

39. The article of claim 38, wherein the stored instructions, when executed by a processor, further result in said packet type comprising a PPP packet and an uplink direction, and said processing comprises sending said packet to a higher layer on said protocol stack.

40. The article of claim 38, wherein the stored instructions, when executed by a processor, further result in said packet type comprising an IP packet and a downlink direction, and said processing comprises creating a PPP packet from said packet, said PPP packet comprising PPP header information and PPP payload information, and sending said PPP packet to a lower layer on said protocol stack.

41. The article of claim 38, wherein the stored instructions, when executed by a processor, further result in said packet type comprising an IP packet and an uplink direction, and said processing comprises determining a service user for said packet, sending said packet to a UDP port if said service user is UDP, and sending said packet to a SCTP port if said service user is SCTP.

42. The article of claim 38, wherein the stored instructions, when executed by a processor, further result in said packet type comprising one of a UDP packet and SCTP packet in a downlink direction, and said processing comprises creating an IP packet from said packet, said IP packet comprising IP header information and IP payload information, and sending said IP packet to a lower layer of said protocol stack.

43. The article of claim 38, wherein the stored instructions, when executed by a processor, further result in said packet type comprising a UDP packet and an uplink direction, and said processing comprises determining a service user for said packet; and sending said packet to an FP port if said service user is FP.

44. The article of claim 38, wherein the stored instructions, when executed by a processor, further result in said packet type comprising a FP packet and a downlink direction, and said processing comprises creating a UDP packet from said packet, said UDP packet comprising UDP header information and UDP payload information, and sending said UDP packet to a lower layer of said protocol stack.

45. The article of claim 38, wherein the stored instructions, when executed by a processor, further result in said packet type comprising one of a Jub FP packet and Jur FP packet in an uplink direction, and said processing comprises sending at least one transport block from said packet to an upper layer of said protocol stack.

46. The article of claim 38, wherein the stored instructions, when executed by a processor, further result in said packet type comprising one of a Iub FP packet and Iur FP packet in a downlink direction, and said processing comprises creating a FP packet from said packet, said FP packet comprising FP header information and FP payload information, and sending said FP packet to a lower layer of said protocol stack.

47. The article of claim 38, wherein the stored instructions, when executed by a processor, further result in said FP payload information comprising at least one transport block.

48. The article of claim 38, wherein the stored instructions, when executed by a processor, further result in said packet type comprising an FP packet in an uplink direction, and said processing comprises retrieving a quality estimate flag from said packet, comparing said quality estimate flag with a predetermined value, and selecting said packet for diversity selection in accordance with said comparison.

49. The article of claim 38, wherein the stored instructions, when executed by a processor, further result in said packet type comprising an FP packet in a downlink direction, and said processing comprises duplicating said packet, and sending said duplicate packet on at least one macro diversity path for said RNC.

50. The article of claim 38, wherein the stored instructions, when executed by a processor, further result in said packet type comprising a MAC-D packet in an uplink direction, and said processing comprises determining validity of a TFI of at least one transport block of said packet, deciphering said at least one transport block, and sending said at least one transport block to an upper layer of said protocol stack.

51. The article of claim 38, wherein the stored instructions, when executed by a processor, further result in said packet type comprising a MAC-D packet in a downlink direction, and said processing comprises ciphering at least one transport block of said packet, determining a transport format combination for said at least one transport block, sending said at least one transport block to a lower layer of said protocol stack using said transport format combination, and reporting measurement information.

52. The article of claim 38, wherein the stored instructions, when executed by a processor, further result in said packet type comprising an RLC-TM packet in an uplink direction, and said processing comprises sending said packet to an upper layer of said protocol stack.

53. The article of claim 38, wherein the stored instructions, when executed by a processor, further result in said packet type comprising an RLC-TM packet in a downlink direction, and said processing comprises creating an RLC SDU packet from said packet, said RLC SDU packet comprising RLC SDU header information and RLC SDU payload information, and sending said RLC SDU packet to a lower layer of said protocol stack.

54. The article of claim 38, wherein the stored instructions, when executed by a processor, further result in said packet comprising a DR packet in an uplink direction, and said processing comprises sending said DR packet to a line card for said RNC.

55. The article of claim 38, wherein the stored instructions, when executed by a processor, further result in said packet comprising a DR packet in a downlink direction, and said processing comprises sending said DR packet to a RLC layer of said protocol stack.

56. The article of claim 38, wherein the stored instructions, when executed by a processor, further result in said packet type comprising a PPP packet in an uplink direction, and said processing comprises sending said PPP packet to a lower layer of said protocol stack.

57. The article of claim 38, wherein the stored instructions, when executed by a processor, further result in said packet type comprising an IP packet in a downlink direction, and said processing comprises creating a PPP packet from said packet, said PPP packet comprising PPP header information and PPP payload information, and sending said PPP packet to an upper layer on said protocol stack.

58. The article of claim 38, wherein the stored instructions, when executed by a processor, further result in said packet type comprising an IP packet and an uplink direction, and said processing comprises determining a service user for said packet, sending said packet to a UDP port if said service user is UDP, and sending said packet to a SCTP port if said service user is SCTP.

59. The article of claim 38, wherein the stored instructions, when executed by a processor, further result in said packet type comprising one of a UDP packet and SCTP packet in a downlink direction, and said processing comprises creating an IP packet from said packet, said IP packet comprising IP header information and IP payload information, and sending said IP packet to an upper layer of said protocol stack.

60. The article of claim 38, wherein the stored instructions, when executed by a processor, further result in said packet type comprising a UDP packet in an uplink direction, and said processing comprises determining a service user for said packet, and sending said packet to an RTP port if said service user is RTP.

61. The article of claim 38, wherein the stored instructions, when executed by a processor, further result in said packet type comprising a RTP packet in a downlink direction, and said processing comprises creating a UDP packet from said packet, said UDP packet comprising UDP header information and UDP payload information, and sending said UDP packet to an upper layer of said protocol stack.

62. The article of claim 38, wherein the stored instructions, when executed by a processor, further result in said packet type comprising a FP packet in an uplink direction, and said processing comprises creating a GTP packet from said packet, said GTP packet comprising GTP header information and GTP payload information, and sending said GTP packet to a UDP port.

63. The article of claim 38, wherein the stored instructions, when executed by a processor, further result in said packet type comprising a GTP packet in a downlink direction, and said processing comprises creating a FP packet from said packet, and sending said FP packet to a FP layer.

64. The article of claim 38, wherein the stored instructions, when executed by a processor, further result in said packet type comprising a PDCP packet in an uplink direction, and said processing comprises compressing a PDCP header for said PDCP packet.

65. The article of claim 38, wherein the stored instructions, when executed by a processor, further result in said packet type comprising a PDCP packet in a downlink direction, and said processing comprises decompressing a PDCP header for said PDCP packet.

66. The article of claim 38, wherein the stored instructions, when executed by a processor, further result in said packet type comprising a PDCP packet in an uplink direction, and said processing comprises creating a FP packet from said packet, and sending said FP packet a FP port.

67. The article of claim 38, wherein the stored instructions, when executed by a processor, further result in said packet type comprising a FP packet in a downlink direction, and said processing comprises creating a PDCP packet from said packet, and sending said packet to a PDCP port.

68. The article of claim 38, wherein the stored instructions, when executed by a processor, further result in said packet type comprising a FP packet in an uplink direction, and said processing comprises creating a RTP packet from said packet, said RTP packet comprising RTP header information and RTP payload information, and sending said RTP packet to a UDP port.

69. The article of claim 38, wherein the stored instructions, when executed by a processor, further result in said packet type comprising a RTP packet in a downlink direction, and said processing comprises creating a FP packet from said packet, and sending said FP packet to a FP layer.

70. The article of claim 38, wherein the stored instructions, when executed by a processor, further result in said packet type comprising a RTP packet in an uplink direction, and said processing comprises creating a FP packet from said packet, and sending said FP packet a FP port.

71. The article of claim 38, wherein the stored instructions, when executed by a processor, further result in said packet type comprising a FP packet in a downlink direction, and said processing comprises creating a RTP packet from said packet, and sending said packet to a RTP port.

72. A wireless network, comprising:
a user equipment (UL),
a Node B in communication with said UL over a wireless link;
a Radio Network Controller (RNC) in communication with said Node B, said RNC comprising a plurality of line cards and an Ethernet backplane to communicate information between said line cards, said line cards comprising an Iub line card comprising slow path processing module (SPPM) and a fast path processing module (FPPM), an Iu line card comprising a SPPM and a FPPM, and a host line card to execute an application for the RNC, said RNC processing a first set of packets having payload information using said FPPM comprising a network processor of said line cards configured to determine a packet type and direction for said packets, and process said first set of packets based on said packet type and direction in accordance with at least one protocol from a protocol stack, said payload information comprising voice information, and said RNC processing a second set of packets having control information using said SPPM comprising a general processor of said line cards.

73. The wireless network of claim 72, wherein said Iub line card and said Iu line card each comprise:
a Switching Module to route packets having control information to said SPPM, and packets having payload information to said FPPM.

74. The wireless network of claim 73, wherein said FPPM further comprises a network processor, with said network processor programmed to process payload information by implementing at least a portion of a set of data plane protocols.

75. An apparatus, comprising:
a line card for a radio network controller (RNC) comprising:
    a Slow Path Processing Module (SPPM) comprising a general processor;
    a Fast Path Processing Module (FPPM) comprising a network processor configured to process payload information by implementing at least a portion of a set of data plane protocols; and
    a Switching Module to route packets with control information to said SPPM, and packets with payload information to said FPPM, said payload information comprising voice information,
    said FPPM configured to determine a packet type and direction for said packets and process said packets based on said packet type and direction in accordance with at least one protocol from a protocol stack;
    said line card to communicate information to a plurality of line cards using an Ethernet backplane of said RNC, wherein at least one of said plurality of line cards to execute an application for the RNC.

* * * * *

UNITED STATES PATENT AND TRADEMARK OFFICE
CERTIFICATE OF CORRECTION

| | | |
|---|---|---|
| PATENT NO. | : 7,646,716 B2 | Page 1 of 1 |
| APPLICATION NO. | : 10/326468 | |
| DATED | : January 12, 2010 | |
| INVENTOR(S) | : Balakrishna P et al. | |

It is certified that error appears in the above-identified patent and that said Letters Patent is hereby corrected as shown below:

In column 12, line 2, in Claim 32, after "packet" insert -- to --.

In column 12, line 24, in Claim 36, after "packet" insert -- to --.

In column 13, line 28, in Claim 45, delete "Jub" and insert -- lub --, therefor.

In column 13, line 28, in Claim 45, delete "Jur" and insert -- lur --, therefor.

In column 15, line 25, in Claim 66, after "packet" insert -- to --.

In column 15, line 47, in Claim 70, after "packet" insert -- to --.

In column 15, line 54, in Claim 72, delete "(UL)," and insert -- (UE), --, therefor.

In column 16, line 1, in Claim 72, delete "UL" and insert -- UE --, therefor.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,646,716 B2  
APPLICATION NO. : 10/326468  
DATED : January 12, 2010  
INVENTOR(S) : P et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Twenty-eighth Day of December, 2010

David J. Kappos  
*Director of the United States Patent and Trademark Office*